United States Patent [19]

Hoffman

[11] Patent Number: 5,352,512
[45] Date of Patent: Oct. 4, 1994

[54] MICROSCOPIC TUBE MATERIAL AND ITS METHOD OF MANUFACTURE

[75] Inventor: Wesley P. Hoffman, Lancaster, Calif.

[73] Assignee: The United States of America as represented by the Secretary of the Air Force, Washington, D.C.

[21] Appl. No.: 980,317

[22] Filed: Nov. 16, 1992

Related U.S. Application Data

[63] Continuation of Ser. No. 691,582, Apr. 24, 1991, abandoned, which is a continuation-in-part of Ser. No. 324,280, Mar. 15, 1989, Pat. No. 5,011,566.

[51] Int. Cl.$^5$ .................. B32B 5/18; B32B 18/00; C04B 38/04; C04B 38/06
[52] U.S. Cl. .................. 428/311.5; 156/155; 264/81; 264/135; 264/137; 264/221; 264/257; 428/288; 428/334; 428/335; 428/336; 428/337; 428/338; 428/339; 428/398; 428/401; 428/408; 428/605; 428/613; 428/698; 428/903; 501/1; 501/81; 501/95; 502/439; 502/527

[58] Field of Search .................. 156/155; 264/81, 137, 264/221, 257; 428/311.5, 334, 335, 336, 337, 338, 339, 398, 401, 408, 605, 613, 698, 903; 501/1, 81, 95

[56] References Cited

U.S. PATENT DOCUMENTS

| | | | |
|---|---|---|---|
| 4,900,483 | 2/1990 | Witzke et al. | 264/29.2 |
| 4,982,068 | 1/1991 | Pollock et al. | 392/488 |
| 5,011,566 | 4/1991 | Hoffman | 156/643 |
| 5,094,906 | 3/1992 | Witzke et al. | 428/220 |

*Primary Examiner*—James C. Cannon
*Attorney, Agent, or Firm*—Donald J. Singer; Stanton E. Collier

[57] ABSTRACT

This invention offers a unique method to fabricate unique, straight, curved, or coiled tubes as small as 5 nanometers in diameter with wall thicknesses starting at about 1 nanometer. These tubes can be made from many materials such as polymers, ceramics and metals that can be applied to a surface of carbon, glass, or other tube forming fibers and then made to withstand the environment used to remove the fiber.

13 Claims, 2 Drawing Sheets

MICROSCOPIC TUBE MATERIAL AND ITS METHOD OF MANUFACTURE

STATEMENT OF GOVERNMENT INTEREST

The invention described herein may be manufactured and used by or for the Government for governmental purposes without the payment of any royalty thereon.

BACKGROUND OF THE INVENTION

This application is a continuation of application Ser. No. 07/691,582, filed 24 Apr. 1991 is now abandoned, which is a continuation-in-part of application Ser. No. 07/324,280, filed Mar. 15, 1989 is now U.S. Pat. No. 5,011,566.

This invention relates to the manufacture of microscopic hollow tubes which are particularly useful in the manufacture of lightweight, thermal barrier and heat exchange materials.

Lightweight, low mass material is widely used for thermal barrier protection shields and for lightweight structural components in devices such as aircraft that place a premium on structurally strong lightweight components. A variety of manufacturing methods are used to produce lightweight, structural materials. These methods include production of composite, non-metallic components and production of components having a reduced weight through the inclusion of spaces and holes. There are, however, limitations to the production of such reduced weight materials since conventional drilling of spaces and holes and electric die machining of holes are costly operations that raise the price of the final component. Other lightweight materials make use of fibers and laminations for producing components having good structural rigidity without the attendant weight of comparable metallic components. Production of materials having layers of fibers or fibrous material with ceramic or epoxy binders is also an expensive manufacturing procedure.

A need therefore exists for a new and inexpensive lightweight material suitable for use in lightweight components for devices such as aircraft.

A need also exists for an improved method of manufacturing hollow materials that are particularly useful for thermal insulation and alternately for gas separation applications.

A further need exists for an inexpensive and efficient method of producing lightweight raw materials for use in the above-mentioned lightweight and thermal insulating components.

SUMMARY OF THE INVENTION

The invention comprises a material composed of microscopic hollow tubes having a wall thickness of at least one nanometer and a diameter of at least 5 nanometers. The tubes can be formed from a wide variety of materials, some of the preferred materials include polymers, silica, carbon, carbides, nitrides and oxides.

The invention also comprises a method for forming the microscopic hollow tubes. The method begins with the step of positioning fibers having a predetermined rate of reaction or solvation at specific temperatures in a preform corresponding to a desired tube configuration. Although a random orientation may be used. The fibers are then cleaned and the temperature of the fibers is adjusted to a preferred deposition temperature in an inert environment. A tube material is then deposited on the fibers to coat them. The tube material has a lower rate of reaction or solvation at specific temperatures than the fibers. The coated fibers may then be heated in a solvent or reactive environment to a temperature at which the fiber is removed at a rate which is at least 10 times faster than the rate at which the fiber coating is removed. During this reaction or solvation, there is no ignition of the fiber material or build up of gas pressure that would damage the tubes which remain after the fiber is removed.

In a preferred embodiment of the invention, the tube material is deposited on the fibers by chemical vapor deposition after the fibers have been cleaned in a high vacuum environment. In one preferred embodiment of the invention the initial fibers comprise carbon fibers, however, practically any other microscopic fibers may be used. Silica and other high temperature oxides are preferred coating materials for the fibers in the preferred embodiment of the invention which utilizes carbon fibers.

In another preferred embodiment of the method of this invention, the fibers used for forming microscopic tubes are removed from the deposited tube material by means of a solvent or a dissolving acid. The solvent or dissolving acid dissolves the inner fiber but is incapable of dissolving the tube material.

BRIEF DESCRIPTION OF THE DRAWINGS

The following and other objects and advantages of invention will be apparent from the following more particular description of the preferred embodiments of the invention.

An example of an embodiment of the invention is illustrated in the accompanying drawings. The drawings are not intended to limit the invention in size or shape but rather to illustrate a typical product produced according to the principles of this invention.

Figure 1:
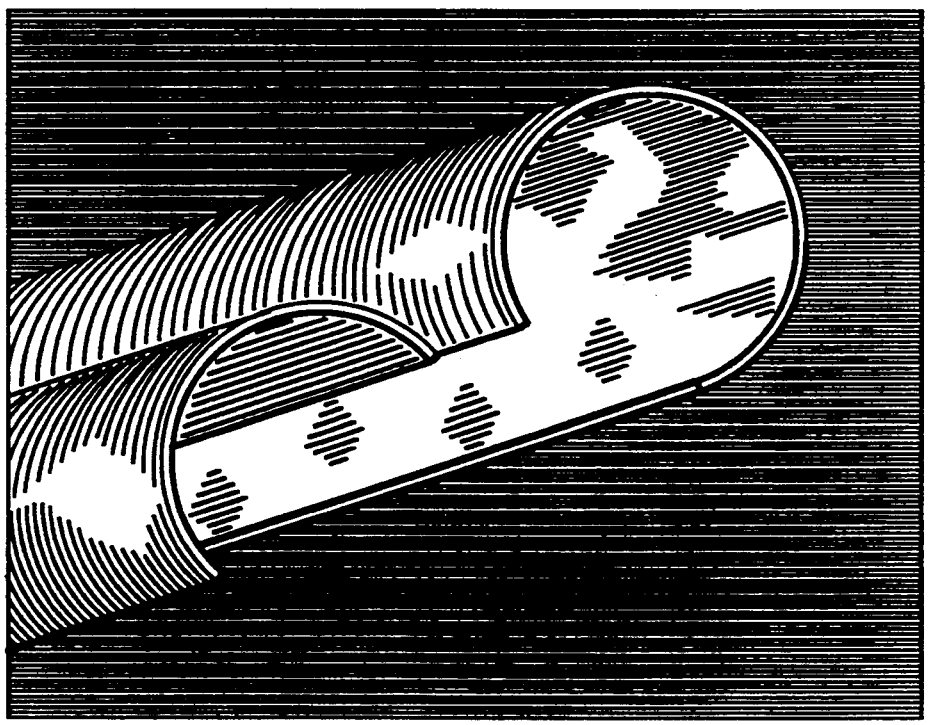

The drawings have been made from scanning electron microscope photographs showing the ends of some representative microscopic hollow tubes produced according to the principles of this invention. Some of the tube ends in the drawings have been intentionally broken open longitudinally for inspection.

Figure 2:
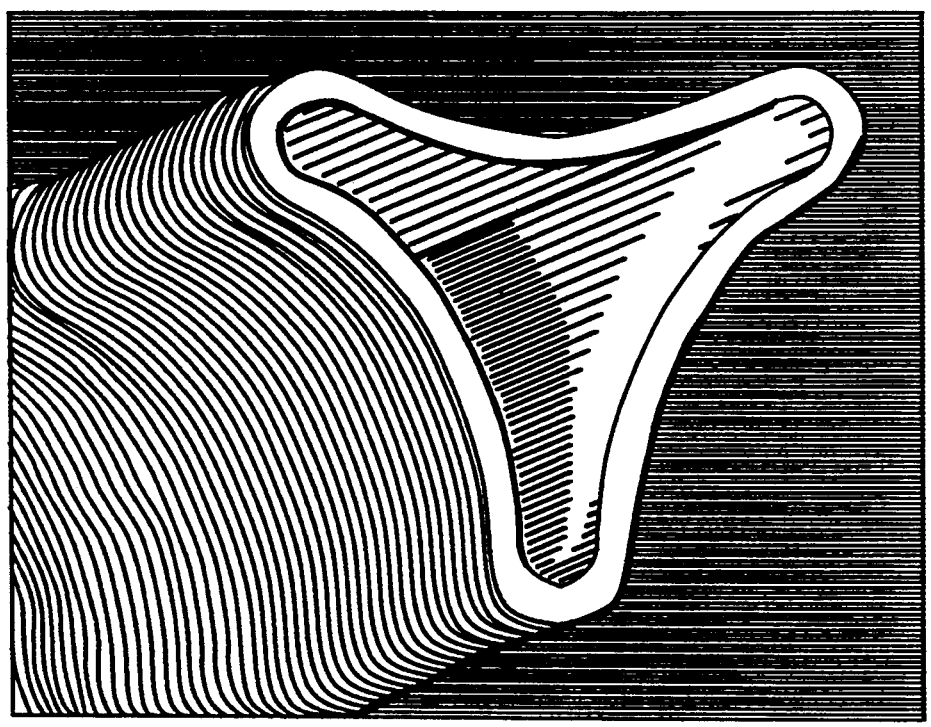
Figure 3:
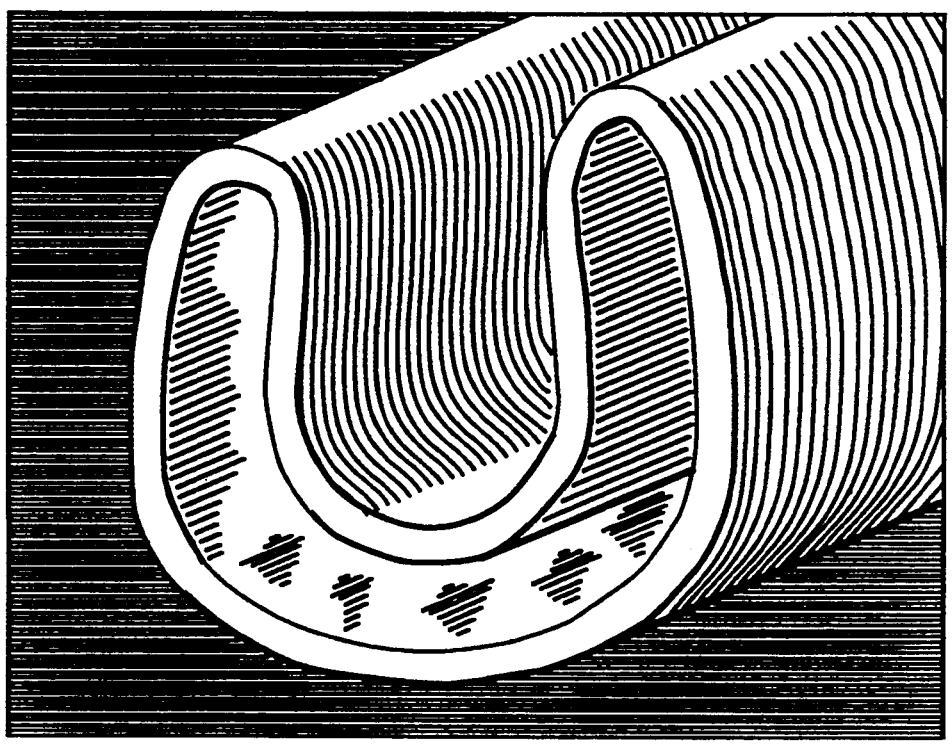

FIGS. 1 to 3 illustrate some of the various hollow tube shapes available by use of the present invention.

Figure 4:

FIG. 4 illustrates a hollow tube surrounded by a material.

DETAILED DESCRIPTION OF THE PREFERRED EMBODIMENT

This invention offers a unique method to fabricate straight, curved, or coiled hollow tubes as small as 5 nanometers in diameter with wall thicknesses starting at about one (1) nanometer. These tubes can be made from many of the materials that can be applied to a surface of carbon, graphite, polymer, metal, glass, or other tube forming fibers and then made to withstand the environment used to remove the fiber. The microscopic tubes are manufactured by applying a surface coating of material such as polymers, carbon, ferrous metal, non-ferrous metals, ceramic, oxides, nitrides, carbides, borides, semiconductor, glass, carbon or diamond to a microscopic fiber which is then removed. This coating can be applied by several processes which include but are not limited to chemical vapor deposition, electrophoresis, and electroplating.

Prior to the coating process the fibers are fixed in the desired preform configuration, meaning the fibers are held or fixed in a desire shape, location and orientation to be rigid therein, for the finished tubes and then cleaned to facilitate uniform deposition of a coating material in a non-oxidizing or inert environment. The fibers are coated with a desired material that will form the tubes when the fibers are removed. For example, carbon or graphite fibers can be removed from a silica coating by reaction with a gas phase species such as air, oxygen or hydrogen. A glass or quartz fiber, for example, can be easily removed with hydrofluoric acid while a polymer fiber can be removed with the appropriate solvent. The preferred method of removing other fiber materials depends on their chemical and physical structure. Once the fiber is removed, the microscopic tube of coating material or materials remains. These tubes have been found to be quite sound structurally. Even microscopic tubes made of quartz have been found to be very strong structurally. Specifically, quartz tubes with wall thicknesses of less than 0.01 microns have been found to be structurally sound.

Tubes formed in this way may be fabricated to stand alone in practically any shape imaginable, or the spaces between the tubes can be filled in to produce a strong lightweight monolithic structure. The resulting channels can transport gas or liquid and also serve to lower structure weight through a reduction of density. Such structures utilize the innate high structural strength of hollow tubes to form strong structural components. Further, the hollow tubes form thermal barriers that reduce the passage of heat.

The basis for this invention is production of tubes of coating material that is not destroyed by the conditions used to remove the fibers. Two specific fabrication techniques for microscopic tube formation which utilize two different fiber substrates are presented below.

EXAMPLE 1

This example discloses the fabrication of quartz tubes and begins with a carbon or graphite fiber substrate. To form quartz tubes on graphitized carbon fibers it is preferred to start with unsized fibers as the substrate. Such fibers were laid up in a preform in a desired configuration and then cleaned of any adsorbed material by heating to 950° C. in the inert environment of a high vacuum apparatus. This step is essential to maintain uniform deposition rates and high quality tube walls. After the fibers were cleaned, their temperature was lowered to the deposition temperature of the desired coating material. In this example silica was used to form the tube walls. For silica, the preferred deposition temperature is between 550° and 650° C. when tetraethoxysilane is used as the precursor. Deposition was carried out at 600° C. until the desired wall (coating) thickness was obtained. In this example a wall thickness of 0.20 microns of silica on the fiber surface was selected. This deposition could have been performed in either a flow or static reactor, but in this example a static reactor was used. In order to fabricate a monolithic piece of silica (imbeding the carbon fibers) the deposition could have been continued in the reactor thus the silica acting as a bonding material. Alternately, the fiber preform can be removed from the reactor and densified with the same or different material by other means, such as, electrophoresis, electroplating, pack cementation, sol-gel, etc.

The removed preform had 0.2 microns of silica on the fiber surface. Having coated the tube forming fibers up to the desired depth the fibers were then oxidized in air after the coating on the ends was removed. The carbon fibers were completely oxidized at 700° C. in air although silica tube material can withstand temperatures in excess of 1000° C. For coating materials that oxidize with detrimentally high rates at 700° C., lower temperatures must be used. It should be noted, however, that the rate of carbon oxidation decreases with temperature and approaches a negligible rate at 450° C. Using this method, the carbon disappeared leaving individual stand alone silica tubes, with length to diameter ratios in excess of 1500. The internal diameter was 10 microns with a wall thickness of 0.2 microns. To form diamond or diamond-like tubes, the carbon fibers would have been removed in a hydrogen environment. The tubes of example 1 are shown in the drawings of FIGS. 1 to 3.

EXAMPLE 2

To form carbon or graphite tubes from quartz fibers the process is very similar to that just described. After the quartz fibers are laid up in the desired configuration and cleaned, the temperature is adjusted for the appropriate deposition. The deposition temperature depends on the type of hydrocarbon used. In this example, propylene was used to deposit a carbon coating, this required a deposition temperature greater than 650° C. If methane had been used to deposit carbon on the quartz fiber the required deposition temperature would have been in excess of 800° C. The coated fiber was removed from the deposition reactor after the desired thickness of carbon had been deposited upon the quartz tube in a non-oxidizing environment. In FIG. 4, the deposition was continued until all the space between the coated fibers was filled resulting in a monolithic carbon body with microchannels. The quartz fiber substrate was then removed by treatment with hydrofluoric acid. This process resulted in the formation of structurally stable carbon tubes.

The two examples described above demonstrate the manufacture of microscopic tubes (or passages in structures) orders of magnitude smaller than any previously known. The tubes have the orientation of the fibers according to the way they are laid out during deposition. Free-standing micro tubes with a diameter in the range of 5 nanometers-1000 microns can hereby be fabricated. It should be noted, however, that in sizes below 3.0 microns the fibers and tubes can become a health hazard similar to asbestos fibers. Thus care is needed in handling these fibers and tubes. When a monolithic body is formed from the fibers a multitude of micro channels are formed when the fibers are removed. Fabrication of materials having a multitude of micro channels will greatly reduce component weight without greatly affecting structural strength. In some instances proper tube orientation will actually give a micro channel lightweight material greater strength and less weight than amorphous structures.

The micro tubes can be coated on the outside with the fibers still in place, or they can be coated on the inside or filled by other means with other materials, after the fibers have been removed. Careful selection of coatings or fill material in combinations with the original tube material will allow formation of microsensors or detectors far smaller than those now available.

Structurally sound free-standing tubes can have a wall thickness of at least 5 nanometers.

The preferred fibers are carbon and graphite. Among their advantages, carbon and graphite are relatively chemically inert at temperatures below 2000° C. and do not react with most materials. In this case graphite does not outgas appreciably below 1500° C., so bubbles are not introduced into the tube structure during deposition. Further, graphite is a high temperature material that can be used to form tubes at higher temperatures than other fibers can survive. Other filaments, however, may be best for specific purposes. For example, quartz fibers are probably the best for fabricating carbon, diamond and diamond-like tubes while polymer fibers are best for making polymer tubes.

If a carbon fiber is used as a tube forming substrate, it can be removed by various means:

If the tube material cannot withstand high temperature, the carbon fiber can be removed in an oxygen plasma at temperatures below 100° C.

The carbon fiber can also be removed in a liquid medium in an acid such as boiling nitric acid at 90° C.

If the tube material is changed or damaged in an oxidizing environment, a reducing environment can be used to remove the carbon fiber. Although lower temperatures can be used, carbon can be removed at a significant rate in hydrogen by forming methane at 1000° C. The hydrogen pressure should be at least atmospheric and preferably above 10 atmospheres in order to get a rate of removal that would be commercially significant.

The carbon fiber can also be removed at a significant rate by subjecting it to steam at atmospheric or sub-atmospheric pressure at temperatures above 725° C.

Carbon dioxide at atmospheric or sub-atmospheric pressure can be used to remove carbon fibers at a significant rate at temperatures as low as 700° C.

Carbon fibers can be removed at a significant rate by exposure to oxygen or air at temperatures above 450° C. For forming tubes, the lower the carbon removal temperature the better. This is to minimize the rate of gasification so that gas pressure will not build up inside the tubes and fracture the thin tube walls.

This invention offers the ability to produce tubes out of a variety of materials with diameters in the submicron range and walls of submicron thickness. Any material with a melting point above approximately 450° C. can be used for deposition on a carbon or graphite fiber. These materials would include the elements listed below and compounds (ferrous and non-ferrous metals, alloys, oxide, nitrides, carbides, borides, etc.) with a melting or sublimation point greater than 450° C. We have chosen 450° C. because the rates of carbon and graphite oxidation decrease with temperature and approach a negligible rate at 450° C. Below 450° C. it would not be commercially feasible to remove the carbon fiber by gaseous oxidation although the carbon could be removed by atomic oxygen or acid treatment. The elements that we consider useful for deposition on carbon to form microscopic hollow tubes are:

| | | |
|---|---|---|
| ALUMINUM | MAGNESIUM | SILICON |
| BORON | MANGANESE | SILVER |
| CERIUM | MOLYBDENUM | TANTALUM |
| CHROMIUM | NICKEL | THORIUM |
| COBALT | OSMIUM | TITANIUM |
| COPPER | PALLADIUM | TUNGSTEN |
| GOLD | PLATINUM | ZIRCONIUM |
| HAFNIUM | RHENIUM | URANIUM |
| IRIDIUM | RHODIUM | |
| IRON | RUTHENIUM | |

In addition, materials that are not soluble in nitric acid or damaged by atomic oxygen can be used on carbon even if their melting point is below 450° C. Any material that is not attacked by hydrofluoric acid can be used for deposition on quartz fibers.

Additional features of the present invention involve the fiber element. For example, catalytic carbon fibers having a thickness of from 5 to thousands of nanometers can be used as sacrifical tube formers. They can be grown in linear form or can be coiled like a miniature spring. Further, the fibers may be made of glass, ceramic, metal or they may be made of polymers so that the fiber removal can occur at very low temperatures without using acid to prevent damage to the tube wall. Polymer fibers may be removed using solvents or by chemical reaction at room temperature while glass and metal may be removed by, for example, acids. Further, these fibers (excluding catalytic carbon fibers) may have almost any shape that is extrudable from a die such as a "C", an "X", a "Y", a "V", etc.

Polymer fibers of the desired diameter as small as 0.1 microns and of the appropriate cross-sectional shape are coated with a different type of polymer, metal, ceramic, glass, etc. The coating can be deposited by techniques such as CVD, sol gel, plasma spray, coacervation, polymeric polymerization, PVD, etc. This coating process is performed at temperatures where both the fiber and the coating are stable and is preferably performed on a clean fiber surface. The temperature is usually below 300 to 400 degrees centigrade and can be performed with certain coatings as low as room temperature.

After the coating has been deposited to the desired thickness (this can even fill in the volume between the fibers), the deposition process is terminated and the fiber is removed from the coating by dissolving the fiber. For low temperature polymeric coatings the fiber can be removed by an appropriate solvent that will not attack the coating. For example, polyacronitrile (PAN) fibers are soluble in tetramethylene sulfone; acrylic fibers are soluble in dilute bases; acetate fibers are soluble in methylene chloride, and nylon fibers are soluble in plenols, cresols, and formic acid. After the fiber has been removed, the solvent is removed by drying or other appropriate means. In the case of metal, ceramic, or glass coatings, for example, the polymer fiber can also be chemically removed at elevated temperature.

If polymer coatings are deposited on glass or metal fibers, these sacrificial tube formers can be removed at room temperature using an acid that will not harm the polymer coating. For example, hydrofluoric acid will attack metals and most glasses including quartz but will not attack many polymers.

Using different sacrificial tube formers the tube walls can be made of practically any material as noted above and can even be of complex composition. For example, alloy tubes such as those made of stainless steel can be fabricated by a sputtering process. Ceramic tubes of boron nitride, silicon carbide or aluminum oxide can be fabricated directly, for example, by a chemical vapor deposition process. Alternatively, the tube's final composition can be achieved during the forming process itself. For example, aluminum oxide tubes can be made by oxidizing an aluminum coating before the fiber is removed and a silicon carbide tube can be made by heating a silicon coated carbon fiber before the fiber is removed.

After the tubes have been formed as noted above, they can be filled with a desired material to make rods of the desired shape and composition after which the tube wall may be removed.

A preform, being an object having a unique shape, is made when the fibers of the desired shape and diameter are positioned and oriented in a desired manner such as by bonding the fibers together or having the fibers held in position by a fixture. Material is then deposited onto the fibers to a desired thickness and the fibers are then removed. Spaces between the tubes may or may not be filled with other types of material or the same material as the tube wall forming a monolithic body.

A monolithic body can be formed by the above fibers having different lengths, cross sectional areas and shapes. These fibers can also be randomly oriented in the body. The tubes are formed essentially as noted above. The spaces between the tubes can be completely filled to produce a composite body and even the tubes themselves can be filled with another material to produce a micro-sensor or micro-display element.

The tubes of this invention form a unique and valuable raw material that can be fabricated into composites used in lightweight high strength structures. These hollow tubes, because of their extremely low weight yet relatively high strength, form the ideal material for the lightweight composite structures for the aircraft and spacecraft of the future.

So called "breathing structures" can also be made of these tubes that will allow gas transfer in only selected directions. Further, the hollow spaces in the tubes impede heat transfer when appropriately encapsulated. Such lightweight heat shield structures are in great demand for hypersonic air vehicles and spacecraft.

Through careful fabrication, a variety of other devices can be produced using the microscopic hollow tubes; these include high efficiency heat exchanges and micro heat exchanges. Extremely accurate injectors for liquid fuel rocket engines can be designed by carefully controlling the form and internal diameter of the encapsulated tubes. Other potential uses include low cost gas separation systems and light intensifier arrays. Microscopic, hollow tubes and structures having microscopic holes or channels clearly have almost innumerable applications in the fields of lightweight structures, rocket propulsion, medicine, optics, micro hydraulics and electronics.

While the invention has been described with reference to the preferred embodiments thereof it will be understood by those skilled in the art that various changes in substance and form can be made therein without departing from the scope and spirit of the invention as detailed in the appended claims.

I claim:

1. A microscopic hollow tube, said tube having an inside diameter of at least about 0.1 microns and a wall thickness of at least 1 nanometer, said tube having been formed by removing the fiber substrate upon which the tube had been deposited by subjecting the fiber substrate to solvation.

2. A microscopic hollow tube as defined in claim 1 which was produced by solvation using an acid.

3. A device, said device containing one or more microscopic hollow tubes positioned in a preselected, non-random orientation, said device having been made by a process comprising the steps of:

selecting one or more fibers characterized by the cross-sectional configuration desired for the inner surface of said microscopic hollow tubes, said one or more fibers having a diameter of at least 0.1 microns and a predetermined rate of chemical reaction or solvation within a specific reactive or solvating environment;

placing an inert environment about said one or more fibers;

adjusting the temperature of said one or more fibers to a deposition temperature of a tube material in the inert environment;

depositing said tube material on said one or more fibers to coat said one or more fibers to a thickness of at least 1 nanometer, said tube material having a predetermined rate of chemical reaction or solvation which is lower than said predetermined rate of reaction or solvation of said one or more fibers;

placing said one or more coated fibers positioned in said preselected, non-random orientation in said reactive or solvating environment; and conducting a reaction or solvation to thereby remove said one or more fibers from said tube material without damaging said tube material.

4. A device as claimed in claim 3 produced by a process which included the step of removing tube material from an end of said one or more fibers to facilitate removal of said fiber material.

5. A device, said device comprising one or more microscopic hollow tubes positioned in a preselected, non-random orientation, said tubes having an inner diameter of at least 5 nanometers, and said device having been made by a process comprising the steps of:

selecting one or more catalytic carbon fibers having a diameter substantially equal to the desired inner diameter of said one or more microscopic tubes, said one or more fibers having a predetermined rate of chemical reaction or solvation within a specific reactive or solvating environment;

cleaning said one or more fibers;

placing an inert environment about said one or more fibers after positioning said one or more fibers in a preselected, non-random orientation;

adjusting the temperature of said one or more fibers to a deposition temperature of a tube material in the inert environment;

depositing said tube material on said one or more fibers to coat said one or more fibers to a thickness of at least 1 nanometer to form one or more coated fibers, said tube material having a predetermined rate of chemical reaction or solvation within said specific reactive or solvating environment, said predetermined rate of chemical reaction or solvation of said tube material being lower than the predetermined rate of reaction of said one or more fibers;

placing said one or more coated fibers positioned in a preselected non-random orientation in said specific reactive or solvating environment; and conducting a reaction or solvation in order to thereby remove said one or more fibers from said tube material without damaging said tube material.

6. A device as defined in claim 5 wherein a length substantially greater than the diameter is characteristic of said one or more microscopic tubes.

7. A device as defined in claim 5 produced by a process which included the step of removing said deposited tube material from an end of said one or more fibers prior to conducting reaction or solvation.

8. A device, said device comprising one or more microscopic hollow tubes, said device having been made by a process comprising the steps of:

selecting one or more fibers having a diameter of at least 5 nanometers and a predetermined rate of chemical reaction or solvation within a specific reactive or solvating environment, said one or more fibers having been made of a material selected from the group consisting of glass, ceramic, metal or polymer;

cleaning said one or more fibers;

placing an inert environment about said one or more fibers;

adjusting the temperature of said one or more fibers to a deposition temperature of a tube material in the inert environment;

depositing said tube material on said one or more fibers to coat said one or more fibers to a thickness of at least 1 nanometer, said tube material having a predetermined rate of chemical reaction or solvation within said specific reactive or solvating environment, said predetermined rate of chemical reaction or solvation of said tube material being lower than the predetermined rate of reaction or solvation of said one or more fibers;

placing said one or more coated fibers in said reactive or solvating environment; and conducting a reaction or solvation in order to thereby remove said one or more fibers from said tube material without damaging said tube material.

9. A device as defined in claim 8 produced by a process which included the step of removing said tube material from an end of said one or more fibers to facilitate fiber removal.

10. A device, said device comprising one or more microscopic hollow tubes positioned in a preselected orientation, said device having been made by a process comprising the steps of:

selecting one or more fibers having a diameter of at least 5 nanometers and having a preselected rate of chemical reaction or solvation within a specific reactive or solvating environment at specific temperatures, said one or more fibers having been made of a material selected from the group consisting of glass, ceramic, metal or polymer;

cleaning said one or more fibers;

placing an inert environment about said one or more fibers after positioning said one or more fibers in a preselected orientation;

adjusting the temperature of said one or more fibers to a deposition temperature of a tube material in the inert environment;

depositing said tube material on said one or more fibers to form one or more coated fibers, said tube material deposited having a thickness of at least 1 nanometer, said tube material having a predetermined rate of chemical reaction or solvation within said specific reactive or solvating environment at said specific temperatures, said predetermined rate of chemical reaction or solvation of said tube material being lower than the predetermined rate of reaction or solvation at said specific temperatures of said one or more fibers;

placing said one or more coated fibers in said preselected orientation in said reactive or solvating environment, and heating said one or more coated fibers with said tube material in said reactive environment at a temperature at which said one or more fibers reacts or solvates at a rate which is at least 10 times faster than said tube material in order to thereby remove said one or more fibers from said material without damaging said tube material.

11. A device, said device comprising one or more microscopic hollow tubes in a preselected orientation, said device having been made by a process comprising the steps of:

selecting one or more fibers having a diameter of at least 0.1 microns and having a predetermined rate of chemical reaction or solvation within a specific reactive or solvating environment, said one or more fibers being made of a polymer;

cleaning said one or more fibers;

placing an inert environment about said one or more fibers after placing said one or more fibers in a preselected orientation;

adjusting the temperature of said one or more fibers to a deposition temperature of a tube material in said inert environment, said tube material being a polymeric material different than the polymeric material composing said one or more fibers;

depositing said tube material on said one or more fibers to coat said one or more fibers, said tube material having a thickness of at least 1 nanometer, and said tube material having a predetermined rate of chemical reaction or solvation within said specific reactive or solvating environment, said predetermined rate of chemical reaction or solvation of said tube material being lower than the predetermined rate of reaction or solvation of said one or more fibers in said reactive or solvating environment;

placing said one or more coated fibers in said preselected orientation in said reactive or solvating environment; and removing said one or more fibers by a chemical reaction or solvation process which does not attack said tube material and does not damage said tube material.

12. A device as defined in claim 10 wherein said removal of said one or more fibers was by an acid which did not attack said tube material.

13. A device as claimed in claim 11 produced by a process which included the step of removing said tube material from an end of said one or more fibers whereby said fiber removal was facilitated.

* * * * *